Jan. 2, 1945.  R. E. CLIFTON  2,366,596
RELIEF VALVE
Filed Dec. 31, 1942

INVENTOR,
ROBERT E. CLIFTON
BY Zugelter, Kinney & Zugelter
Attys.

Patented Jan. 2, 1945

2,366,596

UNITED STATES PATENT OFFICE 2,366,596

RELIEF VALVE

Robert E. Clifton, Blanchester, Ohio, assignor to The Fulflo Specialties Company, Inc., Blanchester, Ohio, a corporation of Ohio Application December 31, 1942, Serial No. 470,778

7 Claims. (Cl. 137—53)

This invention relates to improvements in a relief valve of the high pressure type, and is designed to maintain a predetermined specific pressure in a high pressure fluid system. Reference is made to my copending application for a relief valve filed November 22, 1940, as Serial No. 366,632, which issued as Patent No. 2,333,522, on November 4, 1943, and of which this application is a continuation in part.

An object of the present invention is to provide a relief valve which is so constructed as to be highly sensitive to over-pressures in a high pressure fluid system, and to operate under high pressure conditions without chattering, pounding or vibration.

Another object is to provide a valve including a balanced piston to avoid the need for heavy and powerful springs, thereby resulting in a product which is highly effective and serviceable for long periods of time without requiring attention or parts replacements.

Another object is to provide a relief valve structure wherein wear is minimized and the fluid controlled thereby is relieved without restriction under extremely slight variations in pressure, the use of delicate and intricate mechanisms being avoided in the valve structure.

A further object of the invention is the production of an improved valve of the character referred to above, which may be produced at a low manufacturing cost and with the use of easily and quickly assembled parts capable of withstanding corrosion, wear and distortion under high pressure and high temperature conditions. The present relief valve is designed particularly for rapid and easy replacement of vital parts should replacement become necessary.

The foregoing and other objects are attained by the means described herein and disclosed in the accompanying drawing, in which.

Figure 1:
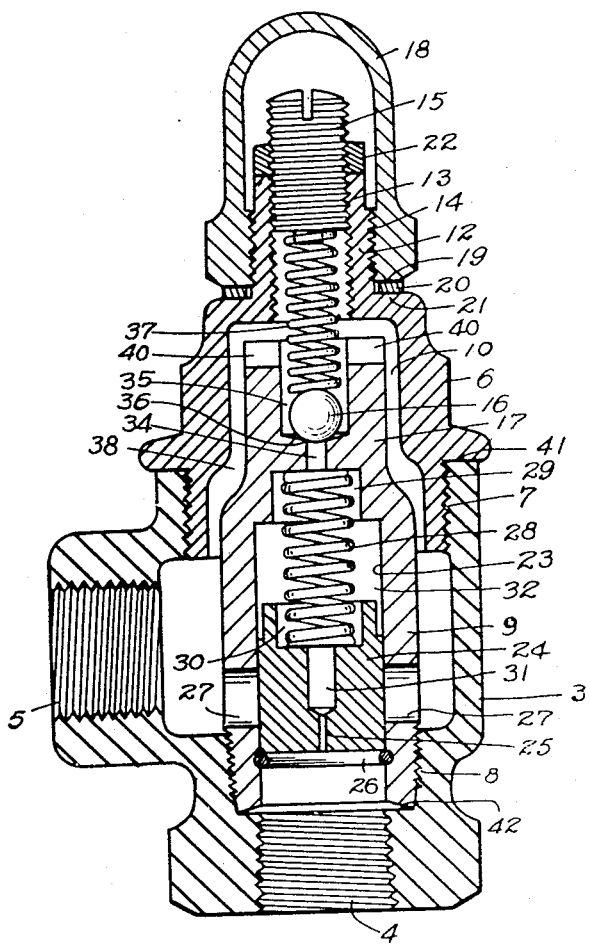
Fig. 1 is a vertical cross sectional view of the improved relief valve of the invention.
Figure 3:
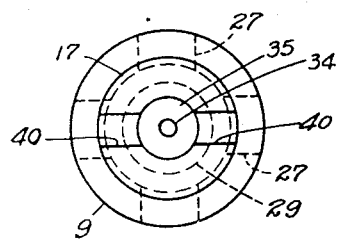
Fig. 3 is a plan view of the cylinder as viewed from above.
Figure 2:
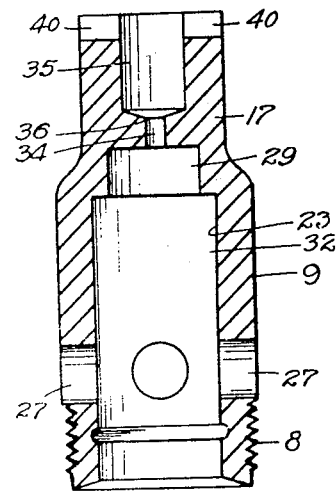
Fig. 2 is a vertical cross sectional view of a hard metal cylinder forming an element of the valve.

With reference to the accompanying drawing, 3 indicates the valve body having an inlet port 4 and an outlet port 5, the valve body being capped by means of a bonnet 6 threadedly connected to the body at 7. In the region of the inlet port 4, the body is interiorly threaded as at 8 to receive and support an upstanding cylinder 9 whose upper end extends into the bonnet chamber 10 leaving a space all around the cylinder for the passage of fluid as will be hereinafter explained.

The upper hollow neck portion 12 of the bonnet is threaded interiorly at 13, and exteriorly at 14, the interior threads being engaged with the threads of an adjusting screw 15 for regulating the seating force of an auxiliary relief valve 16 housed within the upper end 17 of the hardened metal cylinder 9. The exterior threads 14 of the bonnet neck or extension 12 are adapted to engage the interior threads of a dome shaped protective cap 18 that seals the upper end of the adjusting screw. The cap has a lower annular face or seat 19 that bears upon a gasket 20 resting upon the upper annular shoulder 21 of the bonnet, for effecting the seal and rendering it fluid tight. By means of a nut 22 threaded onto the adjusting screw 15, the various adjusted positions of the screw may be effectively maintained.

The interior of cylinder 9 is finished smooth and straight along the wall 23, and within it there is fitted a pressure piston 24 of cylindrical formation. The pressure piston is furnished with a constricted axial bore 25 through which fluid under pressure may pass for equalizing the fluid pressure at opposite ends of the piston. In its normal or closed position, the lower end of pressure piston 24 rests upon a ring 26 or other stop means located in the lower portion of the cylinder. As will be understood, the expanded ring 26 serves merely as an abutment limiting descent of the pressure piston 24.

The piston, in its longitudinal reciprocatory movements, is adapted to cover and uncover one or more of the pressure relief ports 27 formed in the lower section of the piston chamber of cylinder 9. The piston passes the ports 27 with a shearing action, and since the ports are preferably circular like drilled holes, any movement of the piston past them effects a gradual opening and closing of the ports, and thereby avoids sudden surges of fluid under pressure as the piston operates. Accordingly, the action of the valve is smooth and will not induce hammering, pounding, or other vibrations.

The pressure piston is lightly urged toward the depressed or closed position by means of a pressure piston spring 28, which bears at one end upon the top of the piston while its opposite end seats in a depression 29 formed in the reduced head or upper end of the replaceable cylinder. A similar depression 30 may be formed in the head of the piston for reception of the lower end of spring 28. The enlargement 31 of the compensating bore 25 communicates with the piston chamber 32 at all times, in order that the previously mentioned equalization of pressure may be established at opposite ends of the piston.

At the base of depression 29, the head of the cylinder is provided with a secondary or auxiliary relief valve bore 34 which may be axially aligned with the bores 25 and 31. Said bore 34 may be placed in fluid communicating relationship with a well 35 formed in the top or head of the cylinder, whenever pressure of fluid within the piston chamber 32 is of a value sufficient to lift the auxiliary valve 16 from its seat 36. The well 35 houses the auxiliary valve 16 and the valve spring 37 that maintains it upon its seat 36. The force with which the auxiliary valve remains seated, is established by the extent to which the adjusting screw depresses the compression spring 37 against the auxiliary valve. For purposes of adjustment, the head of the screw 15 may be slotted or otherwise adapted for engagement by a suitable tool or turning implement.

From the foregoing, it will be understood that a high pressure of fluid existing in the inlet 4 will enter the constricted bore 25—31 of the pressure piston and will find its way into the chamber above said piston. As long as the fluid pressure is insufficient to unseat the relief or auxiliary valve 16, fluid pressure will be equalized at opposite ends of the main piston 24 and the latter will remain static, being held lightly in the closed position by means of spring 28.

Should the fluid pressure at the inlet 4 increase beyond that for which the valve is adjusted, the pressure building up in chamber 32 above the piston, will unseat the relief or auxiliary valve 16 against the yielding force of its spring 37. The pressure in chamber 32 accordingly will at once be reduced as the fluid relieved overflows the well 35 and spills down through the low pressure chamber 38 between the bonnet and the cylinder, which chamber communicates with the outlet port 5. The resultant decrease of pressure within cylinder 32 permits fluid under pressure entering the inlet 4 to elevate the piston for uncovering the main ports 27, thereby directly relieving the pressure of fluid in the system.

As soon as the pressure is relieved to the extent of permitting spring 37 to close the auxiliary relief valve 16, the pressure in chamber 32 will build up by reason of the passage of fluid through bore 25—31, until equalized pressures above and below the piston are established for balancing the piston. Under that condition, spring 28 will act to return piston 24 to the normal or closed position. The closing action of the piston evidently will be gradual and without shock to the fluid system, by reason of the relatively slow building up of pressure in chamber 32, along with the gradual cutting off or shearing of the circular ports 27.

From the foregoing, it should be understood that the inlet 4 and chamber 32 are for high fluid pressures, whereas port 34 and chambers 35 and 38 along with the outlet port 5, are low pressure ports. The ports 27 of cylinder 9 serve as bypassing ports from high to low pressure areas.

The bore 25—31 of piston 24, being constricted in size, allows gradual increases in pressure to reach chamber 32 and first unseat the auxiliary valve 16 under normal conditions; however, the constriction is such that any very sudden increase of fluid pressure at inlet 4 will operate directly upon the lower end of piston 24 to unseat it quickly, to establish a fully open condition of the large ports 27. The cross sectional area of cylinder 24 and ports 27, is made larger than the inside diameter of the pipes that connect to the inlet and outlet ports 4 and 5, so that there is no restriction whatsoever in the flow of fluid through the valve when unseated.

Attention is directed to the fact that the valve described is particularly useful for operating under high pressure conditions, and for that reason the piston 24 and cylinder 9 preferably are constructed of hardened steel or other wear-resisting metal which could not in practice be used in constructing the entire valve and its body. When it is considered that valves of the character herein disclosed are sometimes used to control fluid pressures approximating six thousand (6,000) pounds per square inch, the need for steel or other tough metal in those parts which must withstand imposition or such pressure, may readily be appreciated. High pressures, moreover, induce severe wear especially upon the piston and cylinder, wherefore it is desirable that these parts be made readily accessible for replacement, preferably without removing the entire valve from the pressure system. With this consideration in view, the present valve has been so constructed that replacements may be made easily and without loss of time. In this connection, it will be noted that the mere unscrewing of the bonnet at the threads 7 serves to immediately expose the entire upper end of the cylinder and the auxiliary valve 16, without in any way disturbing the adjustment of the screw 15 housed within cap 18. The cap need not be loosened or removed from the bonnet, therefore, in order to gain access to the auxiliary valve, the cylinder 9 and the piston 24 therein. When the bonnet is removed, the spring 37 may be lifted from the well 35, and a bar wrench or any other suitable implement may be applied to the slots 40 arranged diametrically across the top or head of the cylinder, and employed to unscrew the cylinder at the threads 8 so as to permit the cylinder and the piston to be removed as a unit for immediate substitution of a new cylinder and piston assembly. To expedite the substitution of the cylinder and piston assembly, the slotted head or upper end of the cylinder is exposed well above the body of the valve when the bonnet 6 is removed, the cylinder being considerably longer than the depth of the valve body as measured from the bonnet seat 41 to the cylinder base shoulder 42. It will be noted that the head of the cylinder is in no manner attached to the bonnet of the valve, but is spaced therefrom all around in order to provide the desired low pressure chamber 38. The wrench slots 40 serve as channels for the release of fluid passing the auxiliary valve 16 and entering the low pressure chamber 38, which latter connects with the outlet port 5.

When a new cylinder and piston assembly is substituted for a worn or damaged assembly, the substitution is rendered complete by merely placing the spring 37 upon the auxiliary valve and then screwing the bonnet tightly into position upon the valve body. As the operation does not disturb the setting of the adjusting screw, it will ordinarily be unnecessary to supplement the service work by removing the protective cap 18 and altering the setting of the adjusting screw. The servicing of the valve, therefore, will be effected expeditiously and without the employment of extraordinary skill and labor. By keeping an extra cylinder and piston assembly on hand, the user of the relief valve of the invention may quickly and inexpensively perform such servicing as the valve will ordinarily require after extended usage in a high pressure fluid system.

It is to be understood that various modifications and changes may be made in the structural details of the device, within the scope of the appended claims, without departing from the spirit of the invention.

What is claimed is:

1. In a relief valve of the character described, the combination of a hollow valve body including a chamber and inlet and outlet ports communicating with said chamber substantially at right angles to each other, said body having an annular bonnet seat opposed to the inlet port, a separate replaceable hard metal cylinder having an open lower end detachably fixed within the valve body in fluid communicating relationship with the valve inlet port, said end including a lateral bypass port through which the interior of the cylinder may communicate with the valve outlet port, a longitudinally bored transversely slotted head end on the cylinder extending through and outwardly beyond the annular bonnet seat of the valve body, the longitudinal bore entering the interior of the cylinder to relieve pressure therein, and providing an auxiliary valve seat beneath the slots of the head end, an auxiliary ball valve resting upon said auxiliary valve seat, a pressure piston reciprocable within the cylinder to close and open the bypass port of the cylinder, means operative when the auxiliary valve is closed to maintain a balance of fluid pressure upon opposite ends of the piston, and means slightly overcoming said fluid balance in the port closing direction of the piston, a detachable hollow flanged bonnet for the valve body including means for maintaining the bonnet flange seated upon the annular seat of the body with the head end of the cylinder extended into the bonnet and spaced therefrom to furnish a low pressure chamber about the cylinder for conveying to the outlet port any fluid released by the auxiliary ball valve, a hollow interiorly and exteriorly threaded neck on the bonnet, a protective cap threadedly engaging the exterior threads of the neck, an adjusting screw threadedly engaging the interior threads thereof, and a compression spring extending through the hollow neck of the bonnet with opposite ends thereof yieldingly contacting the screw of the bonnet and the ball valve of the cylinder.

2. In a relief valve of the character described, the combination of a hollow valve body including a chamber and inlet and outlet ports communicating with said chamber substantially at right angles to each other, said body having an annular bonnet seat opposed to the inlet port, a separate replaceable hard metal cylinder having an open lower end detachably fixed within the valve body in fluid communicating relationship with the valve inlet port, said end including a lateral bypass port through which the interior of the cylinder may communicate with the valve outlet port, a longitudinally bored transversely slotted head end on the cylinder extending through and outwardly beyond the annular bonnet seat of the valve body, the longitudinal bore entering the interior of the cylinder to relieve pressure therein, and providing an auxiliary valve seat beneath the slots of the head end, an auxiliary ball valve resting upon said auxiliary valve seat, a pressure piston reciprocable within the cylinder to close and open the bypass port of the cylinder, means operative when the auxiliary valve is closed to maintain a balance of fluid pressure upon opposite ends of the piston, and means slightly overcoming said fluid balance in the port closing direction of the piston, a detachable hollow flanged bonnet for the valve body including means for maintaining the bonnet flange seated upon the annular seat of the body with the head end of the cylinder extended into the bonnet and spaced therefrom to furnish a low pressure chamber about the cylinder for conveying to the outlet port any fluid released by the auxiliary ball valve, a tubular neck on the bonnet axially aligned with the longitudinal bore of the cylinder, and adjustable means disposed within said bonnet neck for imposing a yielding force upon said ball valve to normally maintain a seated condition thereof, said adjustable means being displaceable unitarily with the bonnet to expose the ball valve and the slotted head end of the cylinder exteriorly of the valve body, thereby to facilitate bodily removal of the cylinder and piston from the valve body interior.

3. In a relief valve of the character described, the combination of a hollow valve body including a chamber and inlet and outlet ports communicating with said chamber substantially at right angles to each other, said body having an opening opposed to the inlet port and including means for detachably mounting a bonnet upon the valve body over said opening, a separate replaceable hard metal cylinder having an open lower end, and cooperative thread means on said lower end and within the valve body for detachably mounting the cylinder in fluid communicating relationship with the valve inlet port, said lower end of the cylinder having a bypass port through which the interior of the cylinder may communicate with the valve outlet port, a longitudinally bored and transversely slotted head end on the cylinder extending through and outwardly beyond the bonnet opening of the body, the longitudinal bore entering the interior of the cylinder to relieve pressure therein and providing an auxiliary valve seat beneath the slots of the head end, an auxiliary valve resting upon said auxiliary valve seat and adapted to be unseated by excessive pressure within the cylinder, a pressure piston reciprocable within the cylinder to close and open the bypass port of the cylinder, means operative when the auxiliary valve is closed to maintain a balance of fluid pressure upon opposite ends of the piston, and means slightly overcoming said fluid balance in the port closing direction of the piston, a hollow bonnet detachably mounted upon the body at the bonnet opening aforesaid with the head end of the cylinder extended into the bonnet and spaced therefrom to furnish a low pressure chamber about the cylinder for conveying to the outlet port any fluid released by the auxiliary valve, a tubular neck on the bonnet axially aligned with the longitudinal bore of the cylinder, and adjustable means disposed within said bonnet neck for imposing a yielding force upon said auxiliary valve to normally maintain a seated condition thereof, said adjustable means being displaceable unitarily with the bonnet to expose said valve and the slotted head end of the cylinder exteriorly of the valve body, thereby to facilitate unscrewing of the cylinder by means of an implement engaging the slotted head.

4. In a relief valve of the character described, the combination of a hollow valve body including a chamber and inlet and outlet ports communicating with said chamber substantially at right angles to each other, said body having an opening opposed to the inlet port and including means for detachably mounting a bonnet upon the valve body over said opening, a separate replaceable hard metal cylinder having an open lower end, and cooperative thread means on said lower end and within the valve body for detachably mounting the cylinder in fluid communicating relationship with the valve inlet port, said lower end of the cylinder having a bypass port through which the interior of the cylinder may communicate with the valve outlet port, an apertured head end on the cylinder extending through and outwardly beyond the bonnet opening of the body, including means exteriorly of the body to engage an implement for unscrewing the cylinder and bodily removing it from the valve body through said bonnet opening, piston means within the cylinder operated by an overpressure of fluid at the inlet port for relieving fluid through the bypass port of the cylinder, means for conveying pressure fluid from the inlet port to the cylinder between the piston and the head-end of the cylinder an auxiliary valve normally closing the aperture near the head end of the cylinder, said valve being opened by a predetermined pressure within the cylinder for relieving pressure of fluid between one end of the piston means and the head end of the cylinder, and a hollow bonnet detachably mounted upon the body over the bonnet opening aforesaid with the head end of the cylinder extended into the bonnet but free of contact therewith to provide a low pressure chamber communicating with the outlet port for receiving fluid relieved by said auxiliary valve.

5. In a relief valve of the character described, the combination of a hollow valve body including a chamber and inlet and outlet ports communicating with said chamber substantially at right angles to each other, said body having an opening opposed to the inlet port and including means for detachably mounting a bonnet upon the valve body over said opening, a separate replaceable hard metal cylinder having an open lower end, and cooperative thread means on said lower end and within the valve body for detachably mounting the cylinder in fluid communicating relationship with the valve inlet port, said lower end of the cylinder having a bypass port through which the interior of the cylinder may communicate with the valve outlet port, an apertured head end on the cylinder extending through and outwardly beyond the bonnet opening of the body, including means exteriorly of the body to engage an implement for unscrewing the cylinder and bodily removing it from the valve body through said bonnet opening, piston means within the cylinder operated by an overpressure of fluid at the inlet port for relieving fluid through the bypass port of the cylinder, means for conveying pressure fluid from the inlet port to the cylinder between the piston and the head-end of the cylinder an auxiliary valve near the head end of the cylinder for opening said head-end aperture of the cylinder at a predetermined inlet pressure, and a hollow bonnet detachably mounted upon the body over the bonnet opening aforesaid with the head end of the cylinder extended into the bonnet but free of contact therewith to provide a low pressure chamber communicating with the outlet port for receiving fluid relieved by said auxiliary valve, a spring yieldingly urging the auxiliary valve to closed position, and spring force adjusting means carried wholly and completely by the bonnet, whereby bodily removal of the bonnet from the valve body leaves the setting of the adjusting means undisturbed while exposing the head end of the cylinder for manipulation exteriorly of the valve body to effect cylinder replacements.

6. A replacement assembly for a high pressure relief valve which includes a pop-off adjustment, said assembly comprising a metallic cylinder having an open lower end carrying mounting threads, said end being perforated laterally to provide a fluid bypass port, an upper head end on the cylinder having a longitudinal bore and a well in fluid communicating relationship with the interior of the cylinder, a valve seat in the well to receive a valve normally closing off communication between the well and the interior of the cylinder, abutment means on the head end to accommodate a tool for rotating the cylinder in mounting and demounting it relative to a valve body, a longitudinally bored piston in the cylinder including a spring seat, and a compression spring having opposite ends bearing against said spring seat and the interior of the cylinder head for urging the piston into closing relationship with the cylinder bypass port, and means normally limiting the port closing movement of the piston and precluding its displacement from the interior of the cylinder.

7. A replacement assembly for a high pressure relief valve which includes a pop-off adjustment, said assembly comprising a metallic cylinder having an open lower end carrying mounting threads, said end being perforated laterally to provide a fluid bypass port, an upper head end on the cylinder having a longitudinal bore terminating in an exterior valve seat in fluid communicating relationship with the interior of the cylinder, said seat being adapted to accommodate a valve for normally closing off flow of fluid from the cylinder past the valve seat, abutment means on the head end of the cylinder to accommodate a tool for rotating the cylinder in mounting and demounting it relative to a valve body, a longitudinally bored piston in the cylinder including a spring seat, and a compression spring having opposite ends bearing against said spring seat and the interior of the cylinder head for urging the piston into closing relationship with the cylinder bypass port, and means normally precluding displacement of the piston from the cylinder through the open lower end thereof.

ROBERT E. CLIFTON.